United States Patent [19]
Barker

[11] Patent Number: 5,664,346
[45] Date of Patent: *Sep. 9, 1997

[54] PORTABLE FOOTWEAR ILLUMINATED

[76] Inventor: Dale E. Barker, 1318 State St., Alton, Ill. 62002

[*] Notice: The term of this patent shall not extend beyond the expiration date of Pat. No. 5,502,903.

[21] Appl. No.: 756,191

[22] Filed: Nov. 25, 1996

Related U.S. Application Data

[63] Continuation of Ser. No. 404,577, Mar. 15, 1995, abandoned, which is a continuation-in-part of Ser. No. 237,790, May 4, 1994, Pat. No. 5,502,903.

[51] Int. Cl.⁶ .............................. A43B 23/00; F21L 15/08
[52] U.S. Cl. .............................. 36/137; 36/136; 362/103; 362/32
[58] Field of Search ............................ 36/137, 136, 132, 36/2.6; 362/103, 32, 800; 24/713.1

[56] References Cited

U.S. PATENT DOCUMENTS

| | | |
|---|---|---|
| 0,352,064 | 11/1886 | Orne . |
| 0,752,433 | 2/1904 | Bagley . |
| 1,166,495 | 1/1916 | Tizzard . |
| 1,209,059 | 12/1916 | Smith . |
| 2,304,367 | 12/1942 | Meyer et al. . |

(List continued on next page.)

FOREIGN PATENT DOCUMENTS

| | | | |
|---|---|---|---|
| 0534560 | 3/1993 | European Pat. Off. | 36/137 |
| 0146353 | 11/1903 | Germany . | |
| 405137604 | 6/1993 | Japan . | |
| 9415494 | 7/1994 | WIPO | 36/137 |

*Primary Examiner*—Ted Kavanaugh
*Attorney, Agent, or Firm*—Haverstock, Garrett & Roberts

[57] ABSTRACT

A self-contained portable illumination unit removably attachable to a wide variety of footwear having a body assembly capable of housing and securely holding a power source, a switching circuit for selectively illuminating the light source, and one end portion of a linear side-glow optical conduit capable of emitting light conducted therethrough radially outwardly from its circumferential periphery substantially along its entire surface area, the one end portion of the linear optical conduit being positioned and located in close proximity to the light source so as to receive light therefrom when illuminated. The body assembly further includes a removable cover member for providing access to the power source and a removably adjustable mounting clip for removably attaching the body assembly to the footwear. When attached to footwear, the linear optical conduit extends exteriorly thereof so as to be visible when illuminated, the linear optical conduit being illuminated substantially along its entire length when the light source is selectively illuminated.

16 Claims, 3 Drawing Sheets

U.S. PATENT DOCUMENTS

| | | | |
|---|---|---|---|
| 2,473,877 | 6/1949 | Goldstein . | |
| 2,671,847 | 3/1954 | Lerch . | |
| 3,067,322 | 12/1962 | Sala . | |
| 3,564,232 | 2/1971 | Elberbe . | |
| 3,663,796 | 5/1972 | Hines et al. . | |
| 3,800,133 | 3/1974 | Duval . | |
| 3,893,247 | 7/1975 | Dana, III . | |
| 4,020,572 | 5/1977 | Chiaramonte, Jr. . | |
| 4,128,861 | 12/1978 | Pelengaris . | |
| 4,130,951 | 12/1978 | Powell . | |
| 4,158,922 | 6/1979 | Dana, III . | |
| 4,234,907 | 11/1980 | Daniel . | |
| 4,438,482 | 3/1984 | Leon et al. . | |
| 4,441,483 | 4/1984 | Cieslak et al. . | |
| 4,471,412 | 9/1984 | Mori . | |
| 4,652,981 | 3/1987 | Glynn | 362/103 |
| 4,704,660 | 11/1987 | Robbins . | |
| 4,727,603 | 3/1988 | Howard . | |
| 4,848,009 | 7/1989 | Rodgers . | |
| 4,957,347 | 9/1990 | Zarian . | |
| 5,033,212 | 7/1991 | Evanyk . | |
| 5,042,892 | 8/1991 | Chiu et al. . | |
| 5,051,095 | 9/1991 | Slenker . | |
| 5,052,131 | 10/1991 | Rondini . | |
| 5,052,778 | 10/1991 | Jamshid . | |
| 5,067,831 | 11/1991 | Robbins et al. . | |
| 5,086,378 | 2/1992 | Prince | 362/103 |
| 5,122,580 | 6/1992 | Zarian et al. . | |
| 5,149,467 | 9/1992 | Zarian . | |
| 5,149,489 | 9/1992 | Crews . | |
| 5,221,387 | 6/1993 | Robbins et al. . | |
| 5,353,786 | 10/1994 | Wilk . | |
| 5,450,293 | 9/1995 | Hoffman | 362/103 X |
| 5,463,537 | 10/1995 | Trattner et al. | 36/137 X |

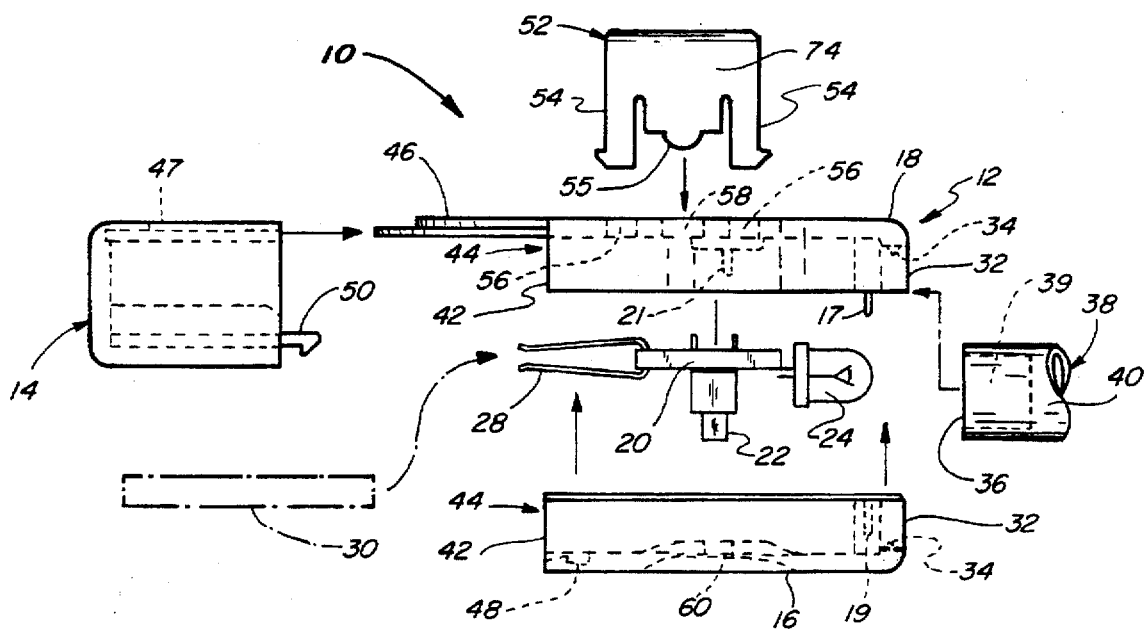

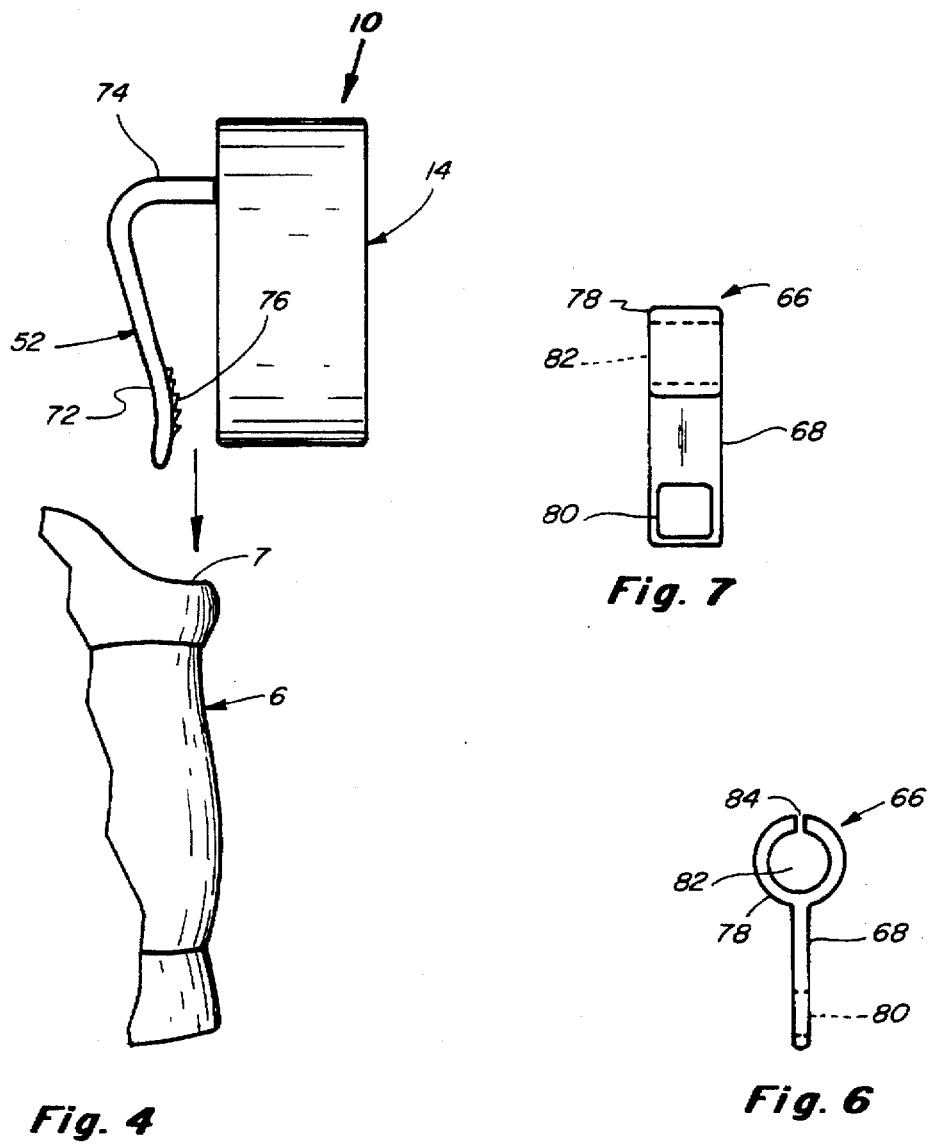
Fig. 4
Fig. 7
Fig. 6
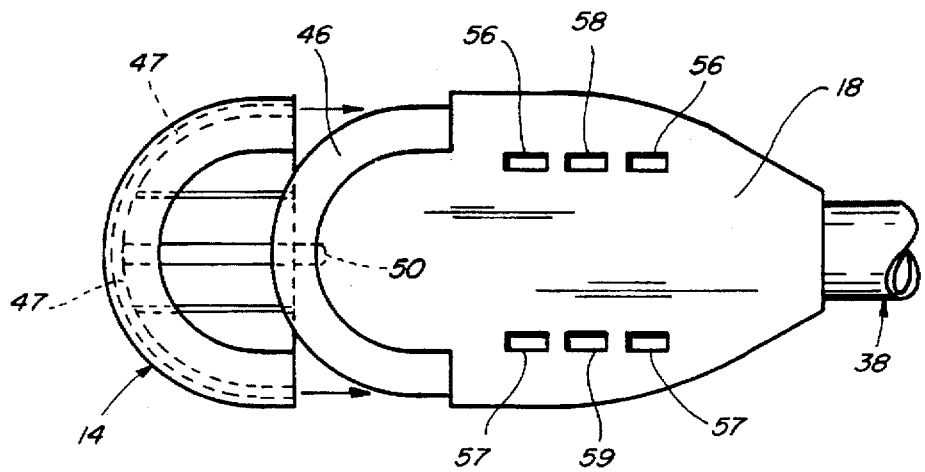
Fig. 5

PORTABLE FOOTWEAR ILLUMINATED

This application is a continuation of application Ser. No. 08/404,577, filed Mar. 15, 1995, now abandoned, which is a continuation-in-part of U.S. patent application Ser. No. 08/237,790, filed May 4, 1994 now U.S. Pat. No. 5,502,903.

The present invention relates generally to illuminated footwear and, more particularly, to an embodiment of a portable footwear illumination device which can be easily attached to and removed from a wide variety of different styles and types of footwear including casual and dress shoes, athletic shoes, ice and roller skates, in-line skates or rollerblades, boots, high-top shoes and other similar footwear. The present embodiment utilizes a linear optical conduit to produce a side-light or side-glow effect which substantially resembles that of neon lighting, the optical transmission properties of the linear optical conduit being such that a major portion of any light conducted therethrough will emit sidewardly or radially outwardly from the outer circumferential surface of such conduit along its entire length in a substantially uniform manner. Accordingly, the entire surface area of the linear optical conduit emits light in a substantially uniform manner, and with a greater light intensity than the lights associated with illuminated shoes presently available in the marketplace. Use of the present illumination means on footwear produces substantially the same aura or glow associated with neon lighting and provides a very attractive and decorative shoe which is highly visible at night.

BACKGROUND OF THE INVENTION

As explained in Applicant's co-pending application Ser. No. 08/237,790, filed May 4, 1994, many different types of illuminated footwear are well known in the art. Typical of such illuminated shoe constructions are those identified in U.S. Pat. Nos. 5,149,489; 5,052,131; 5,033,212; 4,848,009; 4,158,922; 4,130,951; 4,128,861; 4,020,572; 3,893,247; 3,800,133; and 3,564,232 to name a few. Such known constructions generally use miniaturized light-emitting diodes or LEDs, miniaturized point lights, or a plurality of bundled light carrying optical fibers which are housed along with appropriate circuitry for energizing the same within the structure of the shoe so as to produce some type of visible illumination from various portions of the shoe. Typically, such illumination includes point light illumination spaced at various locations around the sole portion of the particular shoe being illuminated as illustrated in U.S. Pat. Nos. 5,033,212; 4,158,922; 4,130,951 and 5,149,489. Also, importantly, only U.S. Pat. No. 4,438,482 discloses a portable illuminating device which comprises a U-shaped member adapted to engage the heel portion of a shoe, this device utilizing various types of incandescent illuminating means which can be either mounted on the surface of the housing, or on the end of a wand or extension member. Although all of the known footwear illumination means achieve some type of decorative illumination of various portions of the shoe, be it either constant or flashing illumination, none of the known constructions utilize linear optics to achieve a neon look of outstanding brightness, evenness and flexibility as will be hereinafter explained, and none utilize linear optics as well as other features of the present invention in a portable unit. The present invention utilizes linear optics in order to achieve its desired illumination effect. Linear light forms have been known for many years and have been utilized in many different types of practical lighting applications such as decorative art forms, pool and spa perimeter and underwater lighting, aisle lighting, and other special effects type illumination. True linear light forms are those in which the source of light is contained within the light form itself such as neon lights, fluorescent lights and other types of tube lighting. Although the present invention strives to achieve a neon type glowing light effect, such simulation is achieved through the use of linear optical conduits wherein the source of illumination is external to the particular optical conduit. In essence, the linear optical conduit functions to conduct and transmit therethrough the light generated by the external source. Optical conduits are commonly referred to as "fiber optics" or "optical fibers". Fiber optics encompass three distinctly different types of functions, namely, telecommunications, coherencies and illumination. Telecommunications fiber optics are used in telephone communications to transmit light from a source to a remote point. Coherent functions involve transmission of a visible image along a bundle of flexible fiber optic conduits to a remote point in such a manner that the placement of the fibers relative to each other at the remote point of site reception is exactly that of the placement of the ends of the fibers relative to each other at the source point of the image of the object which is being transmitted. Both telecommunications and coherent fiber optics are considered point lights and emission of light out of the sides of the optical conduits is to be avoided. Many of the known prior art illuminated shoe constructions utilize some type of fiber optics to achieve point lighting. See, for example, U.S. Pat. No. 4,130,951.

In total contrast, the present invention utilizes a linear optical conduit or other radially emitting light transmissive material wherein the primary function of the linear optical conduit is to provide a means of conducting light from a light source linearly along the length of such optical conduit and emitting such light from the sides thereof along its total length, such that light is emitted in a substantially uniform manner from substantially the entire peripheral surface of the linear optical conduit. The present invention is therefore specifically directed to a self-contained portable footwear illumination device which uses a linear optical conduit to produce a side-light effect somewhat similar to that of a neon light along its entire length.

SUMMARY OF THE INVENTION

The present invention teaches the construction and operation of one embodiment of a portable self-contained footwear illumination device wherein a linear optical conduit or other linear side-glow type fiber optic material is positioned adjacent the exterior portion of the footwear such that at least one end portion of such material lies adjacent to a light source for illuminating the same. The present device includes battery means, a light source, the linear optical conduit, and all necessary circuitry for illuminating the light source and the linear optics via an on/off switch.

More particularly, the present embodiment includes a small body assembly the interior of which holds the battery means, the circuitry, the light source and one end of the linear optical conduit. The body assembly comprises a circuit enclosure member and a mating battery enclosure member. The circuit enclosure member includes first and second portions, means for cooperatively engaging and securing the first and second portions to each other, and means for holding one end portion of the linear optical conduit therebetween adjacent one end thereof. An opening is provided in the first circuit enclosure portion and is dimensioned to allow an on/off switch to project therethrough from the interior of the body assembly. When the first circuit enclosure portion is secured to the second circuit enclosure portion, the circuit enclosure member securely holds the circuitry, the light source and one end portion of the linear optical conduit. When assembled, the end of the circuit enclosure member opposite the linear optical conduit holding means remains open for receiving a portion of the battery means. The battery enclosure member is removably engageable with the open end portion of the circuit enclosure member to close and seal the same during use. Engagement of the battery enclosure member with the open end portion of the circuit enclosure member secures the battery means within the body assembly.

Mating cooperation between the battery enclosure member and the circuit enclosure member is achieved by a latch clip extending from the battery enclosure and configured to engage a recess or other locking means associated with the first portion of the circuit enclosure. The latch clip is configured to allow easy disengagement of the battery enclosure from the circuit enclosure for the purpose of battery replacement. When the battery enclosure is secured to the circuit enclosure, the battery means are fully encased within the body assembly.

A removable mounting clip is provided for attaching the body assembly to any of a wide variety of shoe configurations. The mounting clip includes a downwardly extending flange portion and an outwardly extending portion. The outwardly extending portion extends from adjacent the top end of the downwardly extending flange portion and includes one or more finger segments configured for locking but removable engagement with means located on the second portion of the circuit enclosure member. When the mounting clip is secured to the body assembly, the downwardly extending flange portion is sufficiently spaced from the body assembly to allow such downwardly extending flange portion to be positioned and located over an upper edge portion and within a particular shoe with the body assembly located on the exterior thereof, preferably along one side of the shoe. A plurality of openings provided in the second circuit portion allow the mounting clip to be secured to the body assembly in alternative configurations so that the entire assembly can be mounted to either side of the shoe with the on/off switch facing outwardly away from the shoe and the linear optical conduit extending forwardly towards the front portion thereof. This portable unit can be removably attached and secured to any particular shoe structure depending upon the needs and desires of the user and, as such, affords such a user greater flexibility in that it can be used with many different types and styles of footwear. Further, the small size of the body assembly adds to its convenience and practicality.

One or more linear optical conduit support means are provided for securing the linear optical conduit to the footwear. The support means includes a tubular portion dimensioned for sliding movement along the outer surface of the linear optical conduit and means for securing the linear optical conduit to the shoe. The securing means preferably includes a slotted tab configured to allow a shoelace or other tie to pass therethrough. The tubular support portion is slidably adjustable along the length of the conduit so that it can be appropriately positioned adjacent a lace eyelet. Once so positioned, the lace or tie of the shoe can be looped through the slotted tab during the shoe lacing process to secure the linear optical conduit thereto.

Use of a linear optical conduit which emits light radially outward along substantially the entire surface area of the conduit and in a substantially uniform manner is important to the present invention. Such a conduit structure provides an appealing neon-like glow that heretofore has not been achieved by shoe illumination devices. Also, importantly, since no electricity passes through the linear optical conduit, the present system is extremely safe for use.

It is therefore a principal object of the present invention to provide portable footwear illumination means wherein the illumination means includes the use of a linear optical conduit or other linear side-glow type material which allows light to radiate sidewardly therethrough along substantially its entire surface area and in a substantially uniform manner.

Another object is to teach the construction and operation of a self-contained illumination system which is easily attachable to and detachable from a wide variety of different types of footwear to provide illumination means therefor.

Another object is to teach the use of linear optics in footwear illumination means wherein the linear optics utilized has greater light emission from its circumferential periphery for a given light source as compared to known shoe illumination means.

Another object is to provide footwear illumination means which produce a neon-like glow effect when illuminated.

Another object is to teach the construction and operation of footwear illumination means which utilizes side-glow type fiber optic material wherein the fiber optic material has a substantially uniform light emission distribution from its circumferential periphery even at regions where bends exist.

These and other objects and advantages of the present invention will become apparent to those skilled in the art after considering the following detailed specification in conjunction with the accompanying drawings.

BRIEF DESCRIPTION OF THE DRAWINGS

FIG. 1 is an exploded top plan view of the body assembly of the present illumination means constructed according to the teachings of the present invention;

FIG. 2 is a side elevational view of the body assembly illustrated in FIG. 1;

FIG. 3 is a perspective view of the present illumination means shown in operative position attached to a shoe;

FIG. 4 is a rear elevational view of the present illumination means showing the mounting clip member positioned for engagement with the upper edge portion of a shoe;

FIG. 5 is an exploded side elevational view of the opposite side of the body assembly of FIG. 2 showing the battery enclosure member in position for operative engagement with the circuit enclosure member;

FIG. 6 is a front elevational view of the mounting clip member constructed according to the teachings of the present invention;

FIG. 7 is a side elevational view of the clip member illustrated in FIG. 6; and

DETAILED DESCRIPTION OF THE INVENTION

Figure 8:
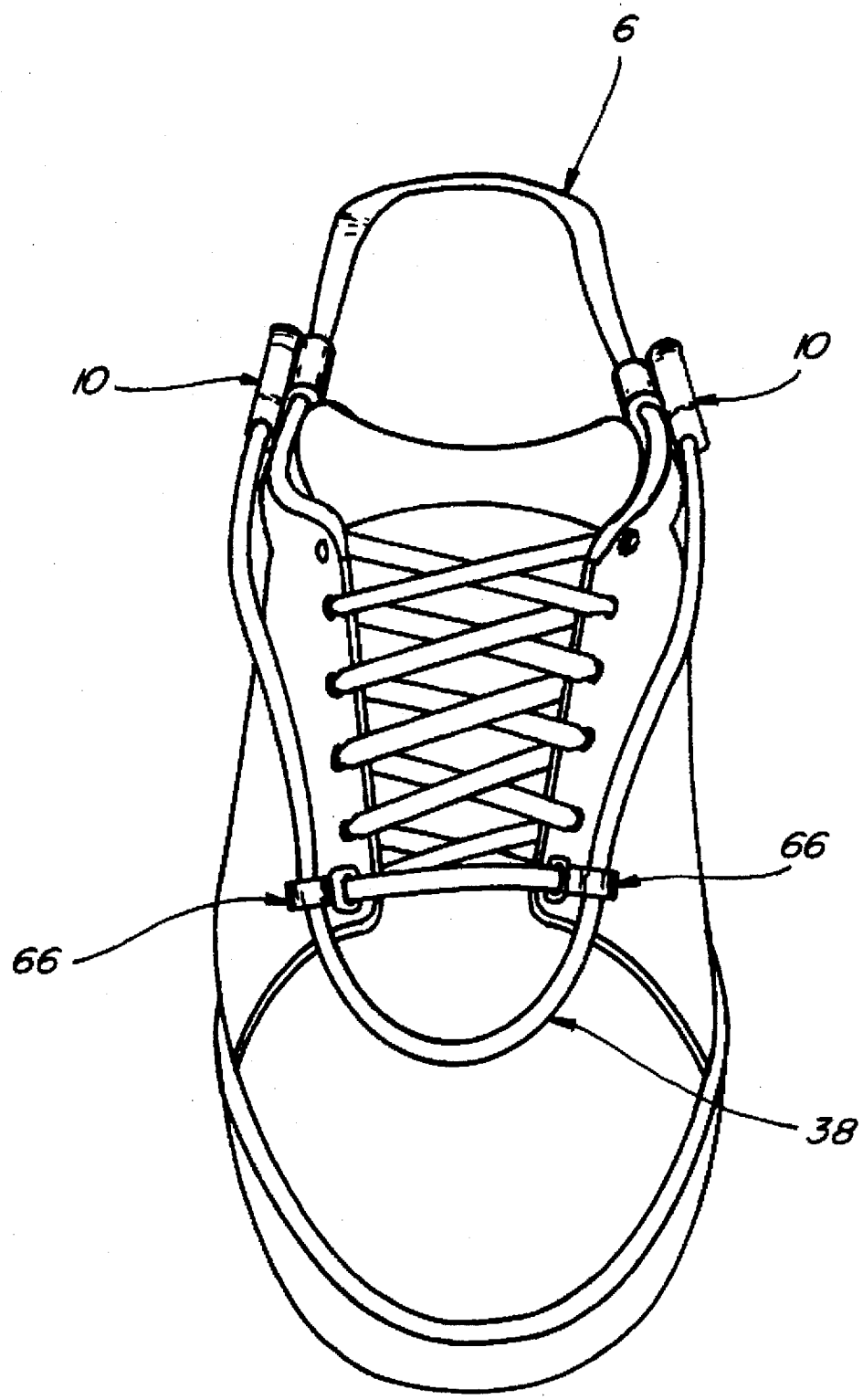
FIG. 8 is a front perspective view of a shoe illustrating the use of a pair of the present illumination means, one of the present illumination units being located on each opposite side of the shoe and a single linear optical conduit extending therebetween around the front portion thereof.

Referring to the drawings more particularly by reference numbers wherein like numerals refer to like parts, number 8 in FIGS. 1-3 identifies a portable footwear illumination device constructed according to the teachings of the present invention. The present illumination device 8 includes a body assembly 10 and a linear optical conduit 38 attached thereto. More particularly, body assembly 10 includes a circuit enclosure member 12 and a mating battery enclosure member 14. Circuit enclosure 12 includes first and second portions 16 and 18, each circuit enclosure portion being configured for mating engagement with each other, such as through the use of any one of a plurality of outwardly extending posts 17 which are cooperatively received in a corresponding plurality of aligned post receiving cavities 19 as illustrated in FIG. 1. In the embodiment illustrated in FIG. 1, the posts 17 are located on the circuit enclosure portion 18 while the aligned cavity receiving means 19 are located on circuit enclosure portion 16. It is recognized and anticipated that other suitable means for cooperatively engaging circuit enclosure portions 16 and 18 may likewise be utilized.

A small circuit board 20 is sized to fit within circuit enclosure 12 and includes an on/off switch 22 which protrudes from first portion 16 when assembled. One end of circuit board 20 is electrically connected to the terminals of a light source 24, such as a light emitting diode or LED. The opposite end of circuit board 20 is electrically connected to a pair of battery clips 28 sized to receive and hold battery means 30. Means for securely holding circuit board 20 is provided within the first and second circuit enclosure portions 16 and 18 and includes at least one circuit board mounting post 21 positioned on enclosure portion 18 for mating with a corresponding opening (not shown) extending through circuit board 20. Here again, any plurality of posts 21 and correspondingly aligned receiver openings may be utilized to properly secure the circuit board 20 within the circuit enclosure member 12. Other suitable receiving means may likewise be employed.

One end portion 32 of circuit enclosure 12 includes at least one pair of opposed retaining tabs 34 for holding one end 36 of the optical conduit 38 such that conduit end 36 is securely held adjacent light source 24. As best shown in FIG. 1, at least one tab 34 is preferably located in the first enclosure portion 16 adjacent one end portion thereof and at least one tab 34 is preferably located in the second enclosure portion 18. Each retaining tab 34 is sized to engage the outer surface 40 of optical conduit 38. The one end 36 of optical conduit 38 may also include a recessed portion or tubular cavity 39 of sufficient size to allow at least a portion of the light source 24 to be inserted therein during assembly. This will further enhance the illumination effect of the present unit.

The opposite end portion 42 of circuit enclosure 12 includes an opening 44 for receiving battery means 30. The second enclosure portion 18 includes an outwardly extending portion 46 configured for sliding engagement with battery enclosure 14 as shown in FIGS. 1 and 5. In this regard, battery enclosure 14 includes a circumferential groove 47 which is specifically located and dimensioned for matingly engaging the outwardly extending portion 46 of enclosure portion 18. The first enclosure portion 16 includes a recess 48 configured for locking engagement with a latch clip 50 extending from battery enclosure 14 as best shown in FIG. 1. Latch clip 50 and recess 48 are also configured to allow simple removal of the battery enclosure member 14 from the circuit enclosure member 12 for replacement of battery means 30. When assembled, the first and second enclosure portions 16 and 18 and battery enclosure 14 form an enclosed housing having sufficient space therewithin for securely holding the battery means 30, circuit board 20, light source 24 and one end portion 36 of optical conduit 38 in proper orientation such that the on/off switch 22 is connected in series circuit between battery means 30 and light source 24 as illustrated in FIG. 1.

A mounting clip 52 as shown in FIGS. 1 and 4 is also provided for attachment to the body assembly 10 so that the assembly 10 can be attached to a shoe or other desired footwear. Mounting clip 52 includes a pair of finger segments 54 (FIG. 1) configured for locking but removable engagement with a pair of openings 56 provided in the second circuit enclosure portion 18 as best shown in FIG. 5. A similarly arranged pair of openings 57 is provided in spaced apart relationship below the openings 56 (FIG. 5) so as to allow mounting clip 52 to be secured to body assembly 10 in an alternative arrangement. More particularly, the openings 56 are positioned so as to allow the mounting clip 52, when engaged therewith, to be in proper position and orientation for engaging the upper edge portion of one side of a shoe, such as the left side, when the illumination device 8 is attached thereto. Similarly, when the body assembly 10 is rotated 180° for attachment to the other side of the shoe, such as to the right side, the openings 57 will likewise be in proper position and orientation for enabling the clip 52, when engaged with openings 57, to likewise be in proper position and orientation for engaging the upper edge portion of the opposite side of the shoe. This arrangement makes the unit 8 compatible for attachment to either side of a particular shoe depending upon the particular orientation of the body assembly 10 as discussed above. The intermediate openings 58 and 59 as shown in FIG. 5 are positioned and located to receive and engage the mounting clip tab projection 55 as shown in FIG. 1.

As shown in FIG. 2, the first portion 16 of circuit enclosure member 12 includes an opening 60 which provides access to on/off switch 22. Optical conduit 38 extends from body assembly 10 and can be dimensioned as desired for any particular footwear. When mounted to a particular shoe, on/off switch 22 faces outwardly away from the shoe as shown in FIG. 3.

The present portable illumination device 8 is shown in FIG. 3 attached to one side of a shoe via mounting clip 52. As best shown in FIG. 4, mounting clip 52 includes a downwardly extending flange portion 72 and an outwardly extending portion 74 which engages body assembly 10 as hereinbefore described. Flange portion 72 is sufficiently spaced from body assembly 10 and is somewhat resilient so as to be slidably insertable over the upper edge 7 of shoe 6 (FIG. 4) while body assembly 10 remains on the exterior of shoe 6 and preferably along one side thereof as shown. Flange portion 72 also includes a plurality of retention ribs 76 configured to provide some retention or gripping capability when the flange 72 is positioned within shoe 6.

Optical conduit 38 extends along the side of shoe 6 towards the front portion thereof as shown in FIG. 3. A second end 62 of optical conduit 38 includes a reflective cap member 64 which will reflect that portion of the light which travels the length of the optical conduit 38 back through such conduit in the opposite direction so as to increase the overall illumination intensity thereof. A conduit support member 66 is also shown in FIGS. 6 and 7 for securing the optical conduit 38 adjacent one side of the shoe 6 as illustrated in FIG. 3. Conduit support member 66 is configured for sliding movement along optical conduit 38 and includes a tab portion 68 and a tubular ring portion 78. Tab portion 68 includes a slot 80 formed therein as best shown in FIG. 7 for allowing the lace or tie 70 of the shoe 6 to pass therethrough as best shown in FIG. 3. Tubular portion 78 includes an opening 82 sized for sliding engagement along the surface 40 of optical conduit 38. Tubular portion 78 also includes a slot or space 84 as best shown in FIG. 6 which allows tubular portion 78 to be pulled or spread apart for attachment to and removal from optical conduit 38, if necessary. Tubular opening 82 and slot 80 are ninety degrees (90°) out of phase with each other so as to allow the tab portion 68 to lie flat against shoe 6 as illustrated in FIG. 3. Once the conduit support member 68 is slidably positioned on the conduit 38 adjacent an appropriate shoelace eyelet, the lace or other tie 70 of shoe 6 can be easily looped or pushed through the tab slot 80 during the lacing process to secure the free end portion of the optical conduit 38 to the shoe.

It is recognized and anticipated that any plurality of conduit support members 66 can be provided, as necessary, to adequately secure the conduit 38 in close proximity to the exterior portion of the shoe and that the length and configuration of the optical conduit 38 can be varied. Also, two portable illumination units 8 could be provided for mounting to opposing sides of a particular shoe with an optical conduit 38 extending along each side portion thereof. Further, two body assemblies 10 could be provided for illuminating one optical conduit 38 such that each body assembly 10 holds opposing ends of a single optical conduit 38 which extends around the front portion of the shoe as illustrated in FIG. 8.

Although several different types of linear optical conduits can be utilized with the present invention, it is generally preferred that the linear optical conduit 38 be comprised of a clad, optical conduit manufactured and sold by the Lumenyte International Corporation of Costa Mesa, Calif. and sold under the trademark "LUMENYTE"®. The "LUMENYTE"® fiber optic conduit is comprised of a light transmitting core having a relatively high refractive index which is surrounded by a tubular cladding made of a heat shrinkable material having a relatively low refractive index as compared to that of the core, such as a fluoropolymer including "TEFLON"® which provides a snug, uniform cladding around such core. The core may be made of polymeric material as disclosed in U.S. Pat. No. 5,122,580, or it may be made of glass or other known materials used for the manufacture of optical conduits. The "LUMENYTE"® fiber optic conduit includes a relatively thin, minimized, uniform gap between the cladding and the core. The light transmitting core and cladding are housed within a clear, semi-rigid finish jacket, the preferred method for forming the finish jacket around the fluoropolymer cladding being by extruding the finish jacket around the clad, cured light transmitting core using a cross heat extrusion dye. The details associated with "LUMENYTE"® linear optical conduits are set forth in U.S. Pat. No. 5,221,387. This particular material is ideal for use with the present invention since the "LUMENYTE"® optical conduit has improved optical efficiency in that it provides for relatively uniform light emission distribution from its circumferential periphery even at regions where bends exist. This means that the "LUMENYTE"® conduit allows light to radiate outwardly through its outer surface along its entire length so as to provide a neon-type look of outstanding brightness and uniformity. Also, importantly, use of the "LUMENYTE"® material likewise has an aura or glow analogous to that of neon-type lighting.

Although clad, optical conduits made by other processes such as those described in U.S. Pat. Nos. 3,641,332 and 5,122,580 may likewise be utilized with the subject invention, such optical conduits are not as optically efficient as the "LUMENYTE"® conduit described above and, in fact, experience scattering problems in that they exhibit numerous bright and dark spots along the length of such conduits especially where bends occur. In this regard, it is important to understand that the coated optical conduits within the field of the present invention must produce linear lighting, that is, such optical conduits must provide a means of conducting light from a light source linearly along the length of the material and must be capable of emitting such light at both the opposite end portion of the conduit from such light source as well as through the circumferential periphery thereof along its entire length. In this regard, the "LUMENYTE"® material is preferred because it provides for a more intense emission of light along its entire length; it allows a greater percentage of the total light conducted therethrough to be emitted from its circumferential periphery than from its non-source end portion; and it emits light relatively uniformly along its entire length and surface area, including bends, as compared to other optical conduits which tend to have a higher illumination intensity at the bend portions thereof as compared to along their straight portions. Such other optical conduits include thermoplastic and thermoset optical conduits.

Also, importantly, a unique feature of the linear optical conduit utilized with the present invention, particularly, the "LUMENYTE"® linear side-glow fiber optical material, is its shapeability or sculptability, that is, it can be manipulated to produce various patterns on the shoe. This can be accomplished in most cases by heating the optical conduit such as with a heating blanket to a certain temperature range as specified depending upon the particular optical conduit being utilized, thereafter shaping such conduit into various configurations while heated, and thereafter subsequently allowing such conduit to cool so as to retain the particular patterned shape.

The color associated with the linear optical conduit may also be varied by simply using a different color LED for a light source. In those cases where an incandescent bulb is used for the light source, it is also recognized that a color lens or filter means may be positioned between the light source 24 and the conduit end portion 36 as more fully disclosed in Applicant's co-pending application Ser. No. 08/237,790, filed May 4, 1994. In this regard, the specific means for holding the filter means in proper position between the light source and the end portion of the linear optical conduit positioned adjacent thereto as disclosed in Applicant's above-referenced co-pending application can likewise be incorporated into the body assembly 10 of the present illumination device 8 and such disclosure is incorporated herein by reference. It is also recognized and anticipated that a wide variety of other filtering arrangements, as well as a wide variety of holding means for maintaining the filter in proper position, can likewise be utilized without departing from the spirit and scope of the present invention. Still further, it is anticipated and recognized that the circuit board 20 may likewise include suitable circuitry to accomplish a wide variety of tasks such as enabling the light source to produce a flashing, blinking or strobing effect. Other circuits and other components can likewise be incorporated into circuit board 20 in order to activate the light source 24 in any particular manner to achieve any particular desired effect.

It is further anticipated that the portable illumination unit 8 can likewise be used in conjunction with shoes that do not include ties or laces. In this situation, the conduit support member 66 may be replaced with other suitable holding means such as a suction cup-type member which would engage the exterior portion of a shoe when pressed thereagainst. Still further, it is recognized and anticipated that the body assembly 10 may take on a wide variety of other shapes and configurations and it is recognized that the mounting clip arrangement 52 can also be constructed in varying constructional configurations without departing from the spirit and scope of the present invention.

Thus, there has been shown and described an embodiment of portable footwear illumination means utilizing novel illuminated linear optics, which illumination means fulfills all of the objects and advantages sought therefore. Many changes, modifications, variations, and other uses and applications of the present construction will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. Illumination means on footwear removably attachable to the footwear wherein the footwear includes front, rear and opposed side portions, said illumination means comprising a power source, at least one light source operatively connected to said power source, at least one side-glow fiber optic conduit having opposed end portions, a body assembly including means for holding and retaining said power source and said light source, said side-glow fiber optic conduit being capable of emitting light conducted therethrough radially outwardly along substantially its entire surface area, at least one end portion of said side-glow fiber optic conduit being positioned and located adjacent to said light source, means for holding the one end portion of said side-glow fiber optic conduit adjacent said light source for directing light thereto, said side-glow fiber optic conduit being illuminated substantially along its entire surface area when said light source is illuminated, and means for removably attaching said body assembly to the footwear, said side-glow fiber optic conduit extending adjacent to at least a portion of one side portion of the footwear when said body assembly is attached thereto, an end to end length of said side glow fiber optic conduit being less than a front to rear length of the footwear.

2. The illumination means defined in claim 1 including switch means operatively connected to said light source and said power source for selectively controlling illumination of said light source.

3. The illumination means defined in claim 1 wherein the means for holding one end portion of said side-glow fiber optic conduit adjacent to said light source includes at least a pair of tab means associated with one end portion of said body assembly for engaging the outer circumferential surface of the fiber optic conduit when positioned therebetween.

4. The illumination means defined in claim 1 wherein said means for removably attaching said body assembly to the footwear includes clip means removably attachable to said body assembly, said clip means having a downwardly extending flange portion associated therewith adaptable for engaging the upper edge side portion of the footwear.

5. The illumination means defined in claim 4 wherein said body assembly includes means for enabling said clip means to be removably attachable to said body assembly in two different orientations, one orientation enabling said clip means to engage the upper edge side portion of the footwear when said body assembly is positioned exteriorly adjacent one side portion of the footwear, the other orientation enabling said clip means to engage the upper edge side portion of the footwear when said body assembly is positioned exteriorly adjacent the opposed side portion of the footwear.

6. The illumination means defined in claim 1 including means slidably movable along at least a portion of said side-glow fiber optic conduit for attaching said optical conduit to the footwear when said body assembly is attached thereto.

7. The illumination means defined in claim 6 wherein said slidably movable attachment means includes a slotted tab portion positioned to allow a lace associated with the footwear to be looped therethrough during the lacing process.

8. The illumination means defined in claim 1 including a reflective cap member engageable with one end portion of said side-glow fiber optic conduit.

9. The illumination means defined in claim 1 wherein said body assembly includes a circuit enclosing portion and a mating battery enclosing portion.

10. The illumination means defined in claim 9 wherein said battery enclosing portion is removably attachable to said circuit enclosing portion for accessing said power source.

11. Illumination means removably attachable to footwear wherein the footwear includes front, rear and opposed side portions, said illumination means comprising a power source, at least one light source operatively connected to said power source, at least one side-glow fiber optic conduit having opposed end portions, a body assembly including means for holding and retaining said power source and said light source, said side-glow fiber optic conduit being capable of emitting light conducted therethrough radially outwardly along substantially its entire surface area, at least one end portion of said side-glow fiber optic conduit being positioned and located adjacent to said light source, means for holding the one end portion of said side-glow fiber optic conduit adjacent said light source for directing light thereto, said side-glow fiber optic conduit being illuminated substantially along its entire surface area when said light source is illuminated, and clip means for removably attaching said body assembly to the footwear, said clip means being removably attachable to said body assembly and having a downwardly extending flange portion associated therewith adaptable for engaging the upper edge side portion of the footwear, said side glow fiber optic conduit extending adjacent to at least a portion of one side portion of the footwear when said body assembly is attached thereto, said body assembly further including means for enabling said clip means to be removably attachable to said body assembly in two different orientations, one orientation enabling said clip means to engage the upper edge side portion of the footwear when said body assembly is positioned exteriorly adjacent one side portion of the footwear, the other orientation enabling said clip means to engage the upper edge side portion of the footwear when said body assembly is positioned exteriorly adjacent the opposed side portion of the footwear.

12. Illumination means removably attachable to footwear wherein the footwear includes front, rear and opposed side portions, said illumination means comprising a power source, at least one light source operatively connected to said power source, at least one side-glow fiber optic conduit having opposed end portions, a body assembly including means for holding and retaining said power source and said light source, said side-glow fiber optic conduit being capable of emitting light conducted therethrough radially outwardly along substantially its entire surface area, at least one end portion of said side-glow fiber optic conduit being positioned and located adjacent to said light source, means for holding the one end portion of said side-glow fiber optic conduit adjacent said light source for directing light thereto, said side-glow fiber optic conduit being illuminated substantially along its entire surface area when said light source is illuminated, means for removably attaching said body assembly to the footwear, said side glow fiber optic conduit extending adjacent to at least a portion of one side portion of the footwear when said body assembly is attached thereto, and means slidably movable along at least a portion of said side-glow fiber optic conduit for attaching said optical conduit to the footwear when said body assembly is attached thereto.

13. Portable illumination means removably attachable to a shoe having front, rear and opposed side portions, said portable illumination means comprising a body assembly and a linear optical conduit, said body assembly being configured to house therewithin light means, switch means connected to said light means, and battery means for providing electrical power to said light means, said battery means being connected to said light means and said switch means, said switch means enabling said light means to be selectively energized by said battery means, said body assembly further including means for attaching one end portion of said linear optical conduit to said body assembly such that said one end portion of said linear optical conduit lies in close proximity to said light means, said body assembly further including removable cover means for providing access to the interior of said body assembly to facilitate battery removal and replacement, and mounting means for enabling said body assembly to be removably attachable to the shoe, said mounting means including a clip member having at least one finger segment which is cooperatively engageable with corresponding means on said body assembly for removably attaching said clip member thereto, said linear optical conduit being capable of emitting light conducted therethrough radially outwardly along substantially its entire surface area, said linear optical conduit being illuminated along substantially its entire surface area when said light means is illuminated.

14. Portable illumination means removably attachable to a shoe having front, rear and opposed side portions, said portable illumination means comprising a body assembly and a linear optical conduit, said body assembly being configured to house therewithin light means, switch means connected to said light means, and battery means for providing electrical power to said light means, said battery means being connected to said light means and said switch means, said switch means enabling said light means to be selectively energized by said battery means, said body assembly further including means for attaching one end portion of said linear optical conduit to said body assembly such that said one end portion of said linear optical conduit lies in close proximity to said light means, said body assembly further including removable cover means for providing access to the interior of said body assembly to facilitate battery removal and replacement, mounting means for enabling said body assembly to be removably attachable to the shoe, said linear optical conduit being capable of emitting light conducted therethrough radially outwardly along substantially its entire surface area, said linear optical conduit being illuminated along substantially its entire surface area when said light means is illuminated, and at least one linear conduit support member for securing said linear conduit to the shoe, said conduit support member including a tubular portion configured for slidable movement along at least a portion of said linear optical conduit and having a tab portion having a slot formed therein dimensioned to allow a lace of the shoe to pass therethrough, said conduit support member being slidably positioned on the linear optical conduit at a location therealong compatible for allowing the lace associated with the shoe to be passed through the tab slot during the lacing process.

15. Illumination means on footwear removably attachable to the footwear wherein the footwear includes front, rear and opposed side portions, said illumination means comprising a power source, at least one light source operatively connected to said power source, at least one side-glow fiber optic conduit having opposed end portions, a body assembly including means for holding and retaining said power source and said light source, said side-glow fiber optic conduit being capable of emitting light conducted therethrough radially outwardly along substantially its entire surface area, at least one end portion of said side-glow fiber optic conduit being positioned and located adjacent to said light source, means for holding the one end portion of said side-glow fiber optic conduit adjacent said light source for directing light thereto, said side-glow fiber optic conduit being illuminated substantially along its entire surface area when said light source is illuminated, and means for removably attaching said body assembly to the footwear, said side-glow fiber optic conduit extending adjacent to at least a portion of one side portion of the footwear when said body assembly is attached thereto, an end to end length of said side glow fiber optic conduit being less than a perimeter length of the footwear.

16. The illumination means defined in claim 15 wherein said side-glow fiber optic conduit extends substantially around the front portion of the footwear such that the other opposed end portion thereof is positioned adjacent a second light source, said second light source having a second power source associated therewith.

* * * * *

UNITED STATES PATENT AND TRADEMARK OFFICE
CERTIFICATE OF CORRECTION

PATENT NO. : 5,664,346

DATED : September 9, 1997

INVENTOR(S) :
Dale E. Barker

It is certified that error appears in the above-indentified patent and that said Letters Patent is hereby corrected as shown below:

On the title page item [54], and at column 1, line 1, the title of the invention "PORTABLE FOOTWEAR ILLUMINATED" should be --PORTABLE FOOTWEAR ILLUMINATION MEANS--.

Signed and Sealed this

Eleventh Day of November, 1997

*Attest:*

BRUCE LEHMAN

*Attesting Officer*     *Commissioner of Patents and Trademarks*